United States Patent [19]

Kubo et al.

[11] 4,280,374

[45] Jul. 28, 1981

[54] TRANSMISSION FOR USE IN MOTOR VEHICLE

[75] Inventors: Seitoku Kubo; Koujiro Kuramochi; Tatsuo Kyushima, all of Toyota, Japan

[73] Assignee: Toyota Jidosha Kogyo Kabushiki Kaisha, Toyota, Japan

[21] Appl. No.: 24,259

[22] Filed: Mar. 27, 1979

[30] Foreign Application Priority Data

May 11, 1978 [JP] Japan .................................. 53-56116

[51] Int. Cl.³ ...................... F16H 37/08; F16H 47/00
[52] U.S. Cl. ...................................... 74/695; 74/701; 74/730
[58] Field of Search ............ 79/695, 688, 700, 665 F, 79/665 G, 674, 701, 730, 694

[56] References Cited

U.S. PATENT DOCUMENTS

| | | | |
|---|---|---|---|
| 2,454,685 | 11/1948 | Avila | 74/701 |
| 2,831,372 | 4/1958 | Boughner | 74/695 X |
| 3,035,455 | 5/1962 | Peras | 74/700 X |
| 3,505,905 | 4/1970 | Lepelletier | 74/695 |
| 3,548,681 | 12/1970 | Crooks | 74/674 X |
| 3,648,544 | 3/1972 | Tanaka | 74/695 |
| 3,722,301 | 3/1973 | Crooks | 74/674 X |
| 4,056,986 | 11/1977 | Hobbs | 74/701 X |
| 4,122,731 | 10/1978 | Bendure et al. | 74/674 |
| 4,128,022 | 12/1978 | Ritter | 74/701 X |

*Primary Examiner*—George H. Krizmanich
*Attorney, Agent, or Firm*—Finnegan, Henderson, Farabow, Garrett & Dunner

[57] ABSTRACT

A transmission for use in a motor vehicle having a torque converter; an auxiliary speed change-gear assembly coaxial with the torque converter; an intermediate shaft extending through the auxiliary speed change-gear assembly; a countershaft extending in parallel to the intermediate shaft of the auxiliary speed change-gear assembly; and a final reduction-gear assembly for transmitting a driving force from the countershaft to wheel axles. The auxiliary speed change-gear assembly provides a plurality of forward speed range drives including overdrive and reverse drive and has an output driving gear. A driven gear is mounted on the countershaft and meshes with the driving gear. The transmission has at least one thrust bearing mounted on the intermediate shaft of the auxiliary speed change-gear assembly for rotatably supporting the driving gear and a member threadably engaged into one end of an auxiliary speed change-gear assembly casing for asserting a predetermined force on the bearing supporting the driving gear. Preferably, the at least one bearing comprises a first pair of counterbalancing thrust bearings mounted on the intermediate shaft rotatably supporting the driving gear. A second pair of thrust bearings are provided for receiving thrust-reacting forces from the first pair of bearings. The force-exerting member is preferably threadably engaged into the one end of the auxiliary speed change-gear assembly casing remote from the torque converter, exerts a predetermined force on one bearing of the second pair, and is accessible from outside the casing.

4 Claims, 5 Drawing Figures

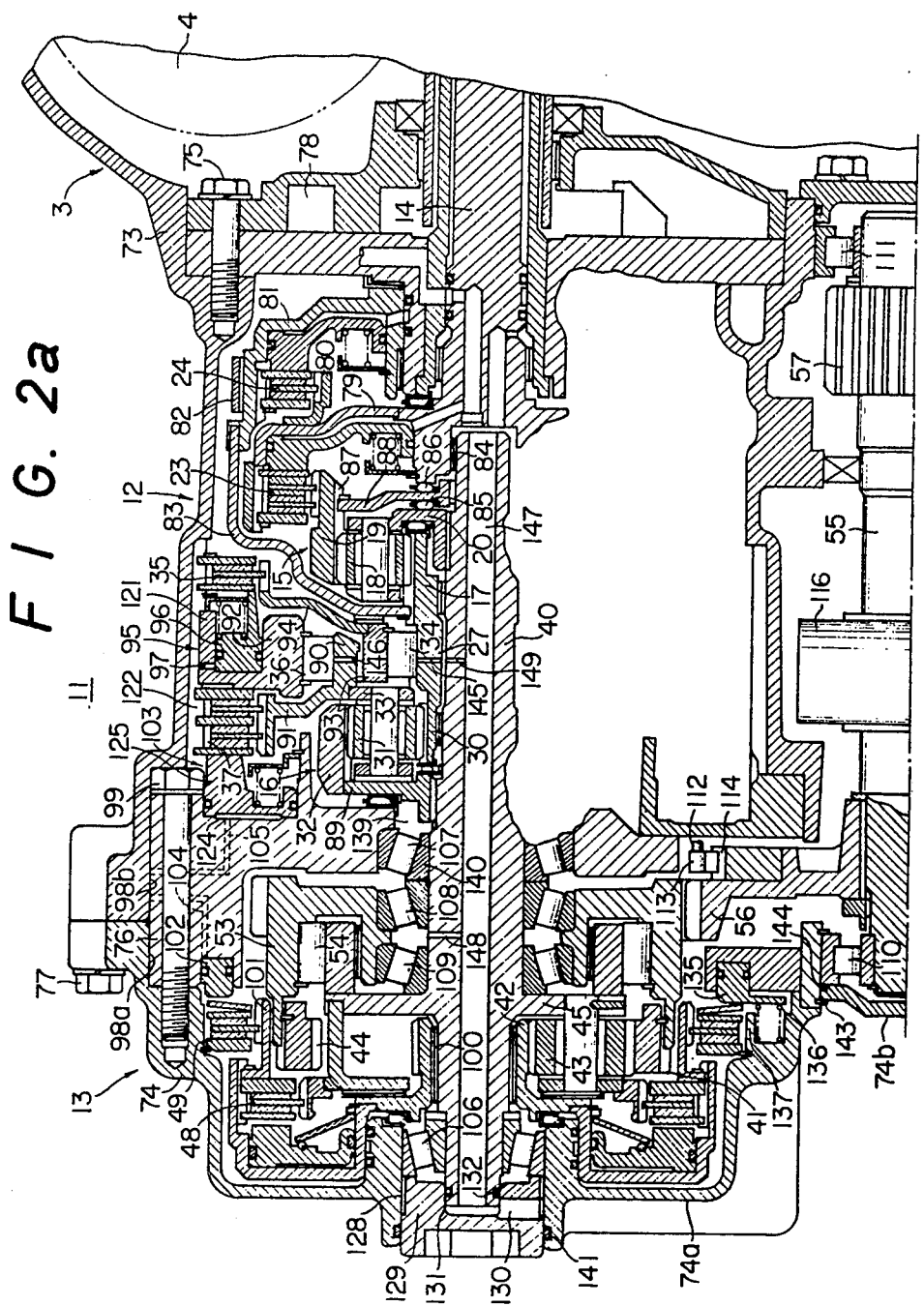

TRANSMISSION FOR USE IN MOTOR VEHICLE

BACKGROUND OF THE INVENTION

This invention generally relates to a transmission for use in a motor vehicle, and more particularly to a transmission having automatic speed change-gear and final reduction-gear assemblies for use in a motor vehicle with an engine mounted transversely therein.

With a view to affording a motor vehicle increased space while providing fuel efficiency and meeting air pollution and noise abatement standards, motor vehicles with front engine, front-wheel drive systems have become recognized as providing numerous advantages. Such advantages include compactness in size, reduction in noise, reduction in the weight of the motor vehicle, and reduction in fuel consumption.

If an automatic speed change-gear assembly for providing four forward speed drives and a reverse drive is incorporated in a transmission for a front-wheel driving system in a motor vehicle with a laterally mounted engine, the overall length of the transmission increases. Because of this, the transmission may interfere with the suspension system of the motor vehicle. This problem is most serious in motor vehicles commonly referred to as compact cars.

The difficulties encountered in providing a satisfactory transmission of this type in a compact car are even more compounded when it is desired to provide an overdrive speed range.

SUMMARY OF THE INVENTION

Accordingly, it is a primary object of this invention to provide a transmission for use in a motor vehicle having at least an automatic speed change-gear assembly for providing four forward speed drives and a reverse drive which minimizes the length of the transmission and provides freedom from interference with the vehicular suspension system.

It is another object of the invention to provide a transmission system for use in a motor vehicle having an automatic speed change-gear assembly for providing a plurality of forward speed drives, including overdrive, and a reverse drive which minimizes the length of the transmission and results in freedom from interference with the vehicular suspension system.

A still further object of this invention is to provide a transmission system which is compact in size, ensures improved fitting of the components of the transmission under various thrust and torque loads, and minimizes manufacturing costs.

Additional objects and advantages of the invention will be set forth in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the transmission of this invention for use in a motor vehicle comprises a torque converter, an auxiliary speed change-gear assembly coaxial with the torque converter and having an output means with a driving gear and a plurality of forward speed range drives including overdrive, and a reverse drive, for transmitting a driving force from the torque converter to the output means, an intermediate shaft extending through the auxiliary speed change-gear assembly, a driven gear mounted on the countershaft and meshing with the driving gear, a final reduction-gear assembly for transmitting a driving force from the countershaft to the wheel axles of the motor vehicle, at least one thrust bearing mounted on the intermediate shaft of the auxiliary speed change-gear assembly and rotatably supporting the driving gear, and, means for exerting a predetermined force on the at least one thrust bearing.

As here embodied, means for exerting a predetermined force is a member threadably engaged into one end of an auxiliary speed change-gear assembly casing.

Preferably, the at least one bearing comprises a first pair of counterbalancing thrust bearings mounted on the intermediate shaft and rotatably supporting the first gear and a second pair of thrust bearings for receiving thrust-reacting forces from the first pair of bearings.

It is also preferred that each bearing of the second bearing pair have an outer race fixed to a stationary portion of the auxiliary speed change-gear assembly and an inner race mounted on the intermediate shaft and adapted to receive the thrust-reacting forces from the corresponding bearing of the first pair.

As is preferred, one bearing of the second bearing pair is mounted on the intermediate shaft at the end of the auxiliary speed change-gear assembly casing remote from the torque converter and the member is threadably engaged at that remote end to exert a predetermined force on that one bearing.

BRIEF DESCRIPTION OF THE DRAWINGS

The accompanying drawings, which are incorporated in and constitute a part of this specification, illustrate an embodiment of the invention and, together with the description, serve to explain the principles of the invention.

FIGS. 2a and 2b are cross-sectional views showing a detailed arrangement of the transmission of FIG. 1;

DETAILED DESCRIPTION OF THE PREFERRED EMBODIMENT

Reference will now be made in detail to the present preferred embodiment of the invention, an example of which is illustrated in the accompanying drawings.

Figure 1:
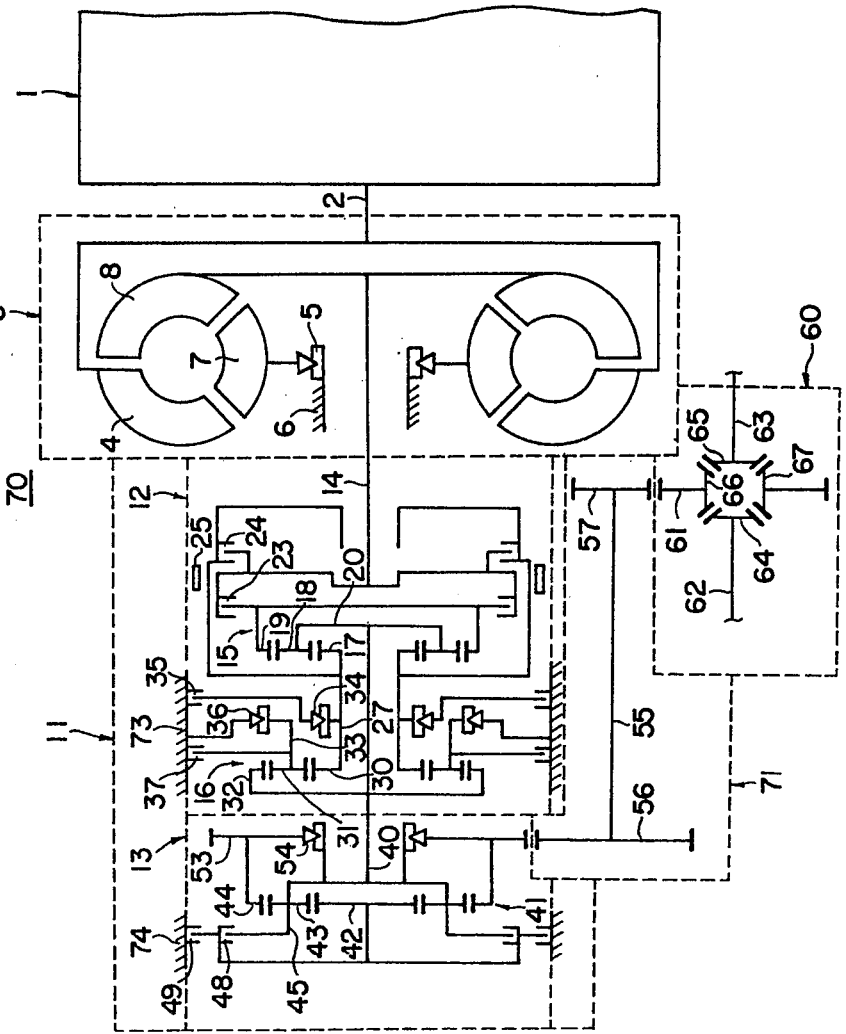
FIG. 1 is a schematic view of one embodiment of a transmission in accordance with the present invention for use in a motor vehicle.
Figure 2B:
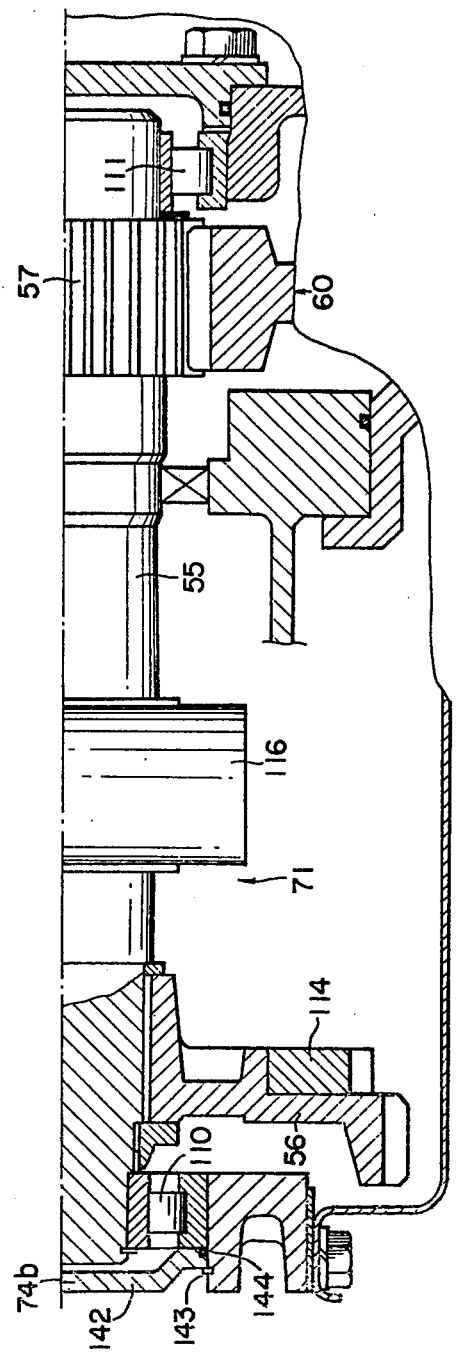

Referring now to FIGS. 1 and 2a and 2b, it may be seen that the transmission according to this invention comprises an automatic speed change-gear assembly 70 having a torque converter 3, preferably of a fluid-type, an auxiliary speed change-gear assembly 11, a transmission gear assembly 71 and a final reduction-gear assembly 60.

As here embodied, the automatic speed change-gear assembly 70 is positioned laterally to an engine 1 for the motor vehicle, with engine 1 being positioned transversely with respect to the axles of the vehicular wheels. The torque converter 3 is positioned laterally adjacent engine 1 and includes a pump impeller 4, a stator 7, and a turbine runner 8. An output shaft 2 of engine 1 is coupled to the pump impeller 4 while the stator 7 is connected, such as by a one-way clutch 5, to a stationary portion 6 of the torque converter 3.

As here embodied, the auxiliary speed change-gear assembly 11 for providing the desired drive speed ranges includes an underdrive gear unit 12 and an overdrive gear unit 13, both of which are mounted coaxially with the output shaft 2 of engine 1. An intermediate shaft 40 extends through the center of auxiliary speed change-gear assembly 11 and is used to transmit power from the underdrive gear unit 12 to the overdrive gear unit 13.

The underdrive gear unit 12 is positioned laterally adjacent the torque converter 3 and has an input shaft 14 coaxial to intermediate shaft 40 and coupled to turbine runner 8 of the torque converter. Preferably, the underdrive gear unit 12 comprises first and second planetary gear mechanisms 15 and 16, respectively. The first planetary gear mechanism 15 has a sun gear 17, planetary pinions 18 meshing with the sun gear 17, a ring gear 19 meshing with pinions 18, and a carrier 20 rotatably supporting ring gear 19 and planetary pinions 18. Preferably, carrier 20 is connected to intermediate shaft 40 by being spline-fitted thereon.

The second planetary gear 16 has a sun gear 30, planetary pinions 31, a ring gear 32 meshing with pinions 31, and a carrier 33 rotatably supporting planetary pinions 31. Sun gear 30 is integrally connected to sun gear 17 by a sun gear shaft 27. Preferably, the sun gear shaft 27 is a hollow shaft surrounding intermediate shaft 40 and is coaxial with the input shaft 14. The sun gears 17 and 30 are integrally formed on this sun gear shaft 27, by forming teeth at opposite ends thereof. Ring gear 32 is preferably connected to intermediate shaft 40 by being spline-fitted thereon through hub 89.

The overdrive gear unit 13 of auxiliary speed change-gear assembly 11 is coaxially positioned on the side of the underdrive gear unit 12 opposite from the torque converter 3. The overdrive gear unit 13 includes at least a planetary gear mechanism 41, which in turn has a sun gear 42, planetary pinions 43, a ring gear 44, and a carrier 45 rotatably supporting planetary pinions 43 and coupled to intermediate shaft 40. Preferably, carrier 45 is formed integrally with shaft 40. As herein embodied, the input element for the overdrive gear unit 13 comprises carrier 45 while the output element of the overdrive gear unit 13 comprises ring gear 44.

To transmit power from the auxiliary speed change-gear assembly 11 to the transmission gear unit 71, assembly 11 has output means comprising a driving gear 53. As herein embodied, output gear 53 is spline-fitted on a member provided between planetary gear unit 41 and cylindrical casing 76 as well as being integrally connected to the ring gear 44.

A fixed casing 73 houses the fluid-type torque converter 3, the underdrive gear unit 12, transmission gear unit 71. Final reduction gear unit 60 is located under transmission gear unit 71. Auxiliary casing 74 substantially houses overdrive unit 13 coaxially with underdrive unit 12. As best seen in FIG. 2a, the underdrive unit 12 is positioned in casing 73 on the engine side thereof, while overdrive gear unit 13 is disposed in a space defined by auxiliary casing 74 with the cylindrical casing 76. The planetary gear unit 41 for overdrive unit 13 is positioned substantially in the central portion of this space. Casing 73 is bolted at one end to the right side surface of the engine at several points and bolted at the other end to auxiliary casing 74 at several points such as at 77 to enclose the cylindrical casing 76.

As here embodied, the cylindrical casing 76 is an inverted U-shaped configuration fitted in the diametrically equal inner cylindrical portions defined by inner walls 98a and 99b of auxiliary casing 74 and casing 73 in the joint portion therebetween. Preferably, cylindrical casing 76 is bolted to auxiliary casing 74, such as at two or more points 99. During assembly, the overdrive gear unit 13 and intermediate shaft 40 are placed first in auxiliary casing 74, then cylindrical casing 76 is fitted into auxiliary casing 74, which is in turn fitted into cylindrical portion 98b of casing 73, and bolted thereto such as at 77 shown in FIG. 2a.

To accomplish the speed-change actions of the auxiliary speed change-gear assembly 11, there are provided friction-engaging means which interact with the different members of the underdrive gear unit 12 and overdrive gear unit 13. An oil pump 78 is fixed to casing 73, as bolted at 75, and serves as an oil pressure and a working oil, such as by an oil pressure control unit (not shown) to respective friction-engaging means and the fluid torque converter. The friction-engaging means include clutches 23, 24 and 48, one-way clutches 34, 36 and 54, and brake units 25, 35, 37, and 49. A detailed description of the friction-engaging elements for operation of the auxiliary speed change-gear assembly 11 will now be made with reference to FIGS. 1 and 2a and 2b and to the following table:

TABLE

| | Clutch and Brake Units | | | | | | | | | |
|---|---|---|---|---|---|---|---|---|---|---|
| Speed Range | 23 | 24 | 25 | 35 | 37 | 34 | 36 | 48 | 49 | 54 |
| First Speed | 0 | | | | 0 | Δ | 0 | | | Δ |
| Second Speed | 0 | | 0 | 0 | | Δ | | 0 | | Δ |
| Third Speed | 0 | 0 | | | | | | 0 | | Δ |
| Overdrive | 0 | 0 | | | | | | 0 | | |
| Reverse | | 0 | | | 0 | | | 0 | | Δ |

The above table shows the operation at the respective transmission stages of these friction-engaging means, in which the designation "0" represents the engagement of the respective clutch and brake units, while the designation "Δ" represents the engagement of the respective one-way clutch units. As is conventional, the engagement and disengagement of each clutch and brake unit is governed by supply of oil pressure from an oil pressure supply unit to an oil pressure servomechanism and discharge of such oil pressure from that servomechanism. The extreme left column identifies the various speed ranges associated with the transmission system, that is first, second, third, overdrive and reverse, and the top column identifies the particular transmission element. It is thus seen, for example, that in first speed range, transmission elements 23, 37, 36, 48 and 54 are engaged, and transmission elements 24, 25, 35, 34 and 49 are not engaged (released).

As schematically shown in FIG. 1, and more particularly depicted in FIG. 2a, clutch unit 23 for use in all direct drives controls the connection between the input shaft 14 and ring gear 19, and clutch unit 24 for use in third speed, overdrive, and reverse, controls the connection of input shaft 14 with sun gear shaft 27 through the sun gear 17. Brake unit 25 for use in second speed controls the connection of the sun gear 17 with fixed casing 73.

As herein embodied, clutches 23 and 24 are positioned on the engine side of the underdrive gear unit 12.

The clutch units 23 and 24 are connected to each other through a drum 79 and a hub 80 which are fixedly attached to input shaft 14, as by welding, with the clutch unit 24 being housed in drum or cylinder 81. Cylinder 81 in turn is rigidly secured to casing 73. A brake band 82 of brake unit 25 is wound to the outer periphery of cylinder 81 of clutch unit 24 in order to arrest sun gear shaft 27 to a locked position during the second speed drive. Because brake band 82 for brake unit 25 is operable only for applying a braking action to the engine, i.e., by operation of one-way clutch 34 during the running of the vehicle, the capacity and width of brake band 82 can be reduced as well as the servopiston for the brake unit. A reduced brake band affords an effective use of the space radially outward of drum 81. For example, the bolt 75 for oil pump 78 can be positioned radially inwardly of the drive casing 73, with a reduction in the outer diameter for the drive casing 73.

Sun gear shaft 27 is spline-fitted on the outer periphery of drum 81 of clutch unit 24, such as through a drive member 83. Sun gear 17 is also preferably spline-fitted to drive member 83. Ring gear 19 is connected to clutch unit 23. Preferably, ring gear 19 has an outer peripheral surface spline-fitted to clutch unit 23 and an inner peripheral surface spline-fitted to a disc 88 disposed between carrier 20 and the end of input shaft 14. Disc 88 is spline-fitted onto intermediate shaft 40 so that it may receive thrust loads.

One-way clutch 34 for use in second speed and brake unit 35 for use in second speed are provided in series relationship to each other between the sun gear shaft 27 and casing 73. One-way clutch 36 for use in first speed and brake unit 37 for use in first speed and reverse are provided in parallel to each other between the carrier 33 and casing 76. One-way clutches 34 and 36 are coaxial with each other as viewed in the radial direction and placed one upon another as viewed in the axial direction. More specifically, one-way clutch 36 is provided between the planetary gear units 15 and 16 as viewed in the axial direction while the brake unit 37 is positioned above the outer periphery of the planetary gear unit 16.

Because the one-way clutches 34 and 36 are positioned between planetary gear units 15 and 16, as viewed in the axial direction of the transmission, and because one-way clutch 36 is positioned outwardly of one-way clutch 34, as viewed in the radial direction of the transmission, the length of the transmission is reduced and effective use of the space radially outwardly of the one-way clutch 34 is achieved. Additionally, this arrangement allows a lubricating oil for one-way clutch 34 to also be used for one-way clutch 36. Such placement thus results in the overall compactness in size of the transmission of this invention, particularly reduction in the length of the auxiliary speed change-gear assembly 11.

Carrier 33 of planetary gear unit 16 is connected to brake unit 37 by hub 91 which is formed integrally with an inner race 90 of one-way clutch 36 for locking during the first speed drive range when one-way clutch 36 is brought into engagement. One-way clutch 34, which is brought into engagement with sun gear shaft 27 during the second speed drive range, is disposed between the radially inner surface of inner race 90 of one-way clutch 36 and sun gear shaft 27. An outer race 92 of one-way clutch 36 is spline-fitted to casing 73 on the right side of brake unit 37, as shown in FIG. 2a. This outer race 92 is provided with a servomechanism 95 for brake unit 35 which governs the connection of the outer race 93 of one-way clutch unit 34 to casing 73 through hub 94 during second speed drive range.

As herein embodied, the servomechanism 95 for brake unit 35 includes a cylinder 121, a piston 96 housed in cylinder 121, and an oil conduit 97 through which oil pressure is introduced into the chamber of the servomechanism. Brake cylinder 121 is formed integrally with the outer race 92 of one-way clutch 36 and is retained in place by spline-fitting its outer peripheral surface in an inner peripheral surface 122 of drive casing 73. This produces many advantages in minimizing components as well as effectively using space.

For a duration during which the brake unit 35 is maintained in the engagement position during second speed drive, one-way clutch 36, for use in the first speed drive range, is maintained in disengaged position. For a duration in which one-way clutch 36 is maintained in engagement during the first speed drive range, brake unit 35 for the second speed drive range is maintained in disengaging position. Eccentricity of one clutch accruing from the engagement thereof may be thus relieved by the spline of the other clutch maintained in disengagement.

The brake unit 37 has a servomechanism 103 disposed in cylindrical casing 76 which has oil passages 105 for supplying oil pressure to that servomechanism. Cylindrical casing 76 has a recess which defines a cylinder 124. Cylinder 124 accommodates a piston 125 for constituting a servomechanism of the brake unit 37. Cylinder 124 is provided radially outwardly of planetary gear unit 16 substantially in superimposed relation thereto in the axial direction as shown in FIG. 2a. Because the cylinder 124 is formed in cylindrical casing 76 and positioned radially outwardly of planetary gear unit 16, this arrangement facilitates placement of oil pressure supply circuit 105 and contributes to reduction in the size of the transmission in the axial direction.

In accordance with the invention, brake unit 37 for use in first speed and reverse, and brake unit 35 for use in second speed, mutually use the inner peripheral surface 122 of casing 73 provided with splined grooves. Consequently use of a friction member common to both brake units 37 and 35 is thus permitted allowing for a less costly device and improved fitting. Additionally, this arrangement allows the outer periphery of the brake cylinder 121 to be retained in position by spline fitting its outer peripheral surface in the inner peripheral surface 122 of the casing 73 using the common spline grooves.

For the overdrive gear unit 13, clutch unit 48 used during first, second, third and reverse speeds governs the connection of carrier 45 with sun gear 42, while brake unit 49 used during overdrive governs the connection of sun gear 42 with auxiliary casing 74. One-way clutch 54 used during first, second, third and reverse speeds governs the connection of carrier 45 and ring gear 44 with the output gear 53. The clutch unit 48 is provided at the portion of the auxiliary casing 74 remote from the torque converter 3. A cylindrical hub 101 is secured to clutch unit 48 and spline-fitted to the brake unit 49. Brake unit 49 is located between the inner peripheral wall of auxiliary casing 74 and the planetary gear unit 41 and is used to secure sun gear 42 to auxiliary casing 74. Gear 42 is in mesh with pinions 43, supported through bushing 100 by intermediate shaft 40, and connected by cylindrical hub 101 to brake unit 49.

Figure 3:
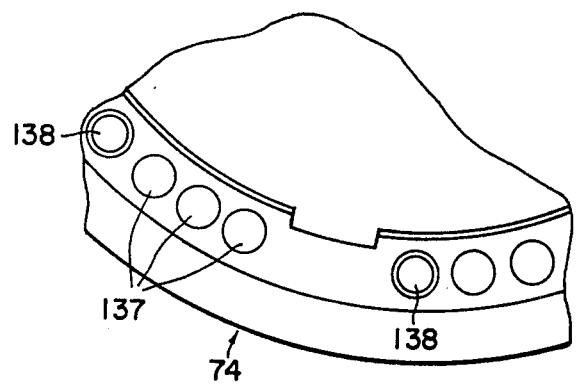
FIG. 3 is a fragmented side view of the casing for the auxiliary speed change-gear assembly of the transmission of FIGS. 1 and 2a and 2b; and, FIG. 4 is a schematic and perspective view of the transmission of FIGS. 1 and 2a and 2b in relationship to the wheel axles and suspension system of a motor vehicle.

As herein embodied, the brake unit 49 has a servomechanism 102 disposed within cylindrical casing 76, which in turn has oil passages 104 for supplying oil pressure to the servomechanism 102. Servomechanism 102 includes a piston 135 and return springs 136 for piston 135. The return springs are retained in holes 137 provided in the auxiliary casing 74, as shown in FIG. 3, and positioned radially outwardly of a friction member in brake unit 49. This arrangement dispenses with the return seat and a snap ring which are normally needed, such as in brake unit 37. The holes 137 for retaining return springs 136 utilize a spacing between bolt holes 138, as shown in FIG. 3, provided in the peripheral portion of auxiliary casing 74. Accordingly, best use is made of the space in the circumferential direction of auxiliary casing 74.

The one-way clutch 54 is brought into engagement during direct drive and governs the connection of carrier 45 and ring gear 44 with output gear 53. This clutch is disposed between the carrier 45 and output gear 53 as viewed in the axial direction. As viewed radially, one-way clutch 54 is disposed between the output gear 53 and the intermediate shaft 40. One-way clutch 54 allows the relative rotation of the overdrive unit during overdrive while transmitting force directly from the intermediate shaft 40 to the output gear 53 at the time of direct underdrive, i.e., the first to third speed drive ranges. By such an arrangement the service life of planetary gear unit 41 can be extended.

In order to provide the above configuration, the transmission of this invention further comprises bearings for rotatably supporting the output gear 53. As here embodied, thrust bearings 108 and 109 are placed between intermediate shaft 40 and output gear 53. Bearing 109 adjoins the thrust bearing 108 and contacts carrier 45. The bearings 108 and 109 are arranged so as to receive a thrust acting on the intermediate shaft 40 in the opposite directions when a vehicle is run forward or backward. The one-way clutch 54 is positioned radially between intermediate shaft 40 and output gear 53 through bearings 108 and 109. Accordingly the inner and outer races of this one-way clutch 54 are positively supported by the bearings with assurance of a reliable centering. Furthermore, lubricating oil fed to the bearings located radially inwardly of output gear 53 can be introduced via the wall surface between the output gear 53 and carrier 45 to one-way clutch 54, by virtue of a large centrifugal oil pressure, whereas a usage rate of the lubricating oil is greatly increased. Since the one-way clutch 54 may be placed in this arrangement within the driving gear 53 which serves as the output of the auxiliary speed change-gear assembly 11, a more compact overdrive unit 13 can be achieved, including reduction in the length of the transmission.

In accordance with the invention, the transmission further comprises bearings for receiving the thrust-reacting forces from the bearings rotatably supporting the output gear. As here embodied, these bearings comprise thrust bearings 106 and 107 positioned on opposite sides of the bearings 108 and 109. Each bearing 106 and 107 has an outer race fixed to a stationary portion of the auxiliary speed change-gear assembly and an inner race mounted on the intermediate shaft 40 and adapted to receive the thrust-reacting forces from the corresponding bearings 109 and 108. Preferably, all of the thrust bearings 106 through 109 are roller bearings.

To the effect that the intermediate shaft 40 is rotatably supported at one end of the overdrive gear mechanism remote from the underdrive gear mechanism by casing 73 and auxiliary casing 74, the thrust bearing 106 is placed between that end of intermediate shaft 40 and auxiliary casing 74. The bearing 107 is placed between the intermediate shaft 40 and cylindrical casing 76 for supporting shaft 40 toward its other end. Consequently, these thrust bearings 106 and 107 are so arranged to receive a thrust acting on the intermediate shaft 40 in the opposite directions when a vehicle is run forward or backward.

Owing to the axially longer length of bearings 108 and 109, any momentary load due to thrust occurring in the output gear 53 is received by those bearings 108 and 109. The reacting force of bearings 108 and 109 is received by casings 76 and 74 through bearings 107 and 106.

Furthermore, as here embodied, an annular hole 139 is provided within cylindrical casing 76 in the central portion of the axially inner end surface thereof, so that any leftward thrust, as viewed in FIG. 2a, of the planetary gear units 15 and 16 is transmitted via the ring gear 32 of planetary gear unit 16 to inner race 140 of thrust bearing 107. Since ring gear 32 is spline-fitted on intermediate shaft 40, a relative rotational difference between ring gear 32 and inner race 140 of bearing 107 does not occur. As may be seen, planetary gear units 15 and 16 require neither thrust bearings nor thrust races, resulting in a less costly device as well as reduction in the length of the device. Although the inner race of bearing 108 positioned between output gear 53 and intermediate shaft 40 is in engagement with inner race 140 of bearing 107, the thrust arising in bearing 108 is offset by the thrust from ring gear 32. An excess of the thrust generated by output gear 53 is received by cylindrical case 76, without a risk of its being exerted on ring gear 32.

A difference in rotation between the output gear 53 and intermediate shaft 40 arises only in the overdrive speed range. If i represents the overdrive gear ratio and n is the r.p.m. of the intermediate shaft, then a difference in rotation therebetween is $(1-i)N$ and of a small value. A torque transmitted from the output gear 53 at the time is iT, with an input torque from intermediate shaft 40 being T. Since this value is normally small, the bearings 108 and 109 can comprise bearings of small capacity and yet achieve their necessary function. In addition, by virtue of this invention, the bearings 108 and 109 are mounted radially inwardly of the output gear 53 for the most effective use of that inner space. The intermediate shaft 40, furthermore, is positively supported by the bearings 106 through 109 with a reliable centering of the components of the auxiliary speed-change gear assembly 11.

In accordance with the invention, the transmission further comprises means for exerting a predetermined force on the bearing rotatably supporting the output gear. As herein embodied, the means for exerting a predetermined force comprises a member threadably engaged into a stationary end of the auxiliary speed change-gear assembly 11. Preferably, a threaded hole 128 is provided in auxiliary case 74 in the central portion of the axially outer end surface thereof and a nut 129 is threaded into hole 128. The rightward force, as seen in FIG. 2a, exerted by nut 129 acts on the intermediate shaft 40 by way of thrust bearing 106. Preload force is thus exerted on all of the thrust bearings 106 through 109. As can be seen from FIG. 2a, exerting a predetermined force on the bearings 106 through 109 by means of a nut 129 which is accessible from outside the transmission housing allows for an improved and easier fitting of the overdrive gear unit to the auxiliary speed change-gear assembly.

In the described embodiment for providing a predetermined force on the thrust bearings 106 through 109 by means of nut 129, a radial hole 130 for a lubrication circuit is provided in the nut 129 so that a lubricating oil can be supplied through hole 130 to the inner peripheral surface 131 of nut 129. This inner peripheral surface 131 acts as a sliding surface relative to a seal ring 132 for intermediate shaft 40. A seal member, such as O-ring 141, is provided in the threaded hole 128 for ensuring proper sealing between the auxiliary casing 74 and the nut 129. By doing so, the need to provide such a sealing member for the lubrication circuit is eliminated. Because of the preload acting on the thrust bearings 106 through 109, the centering between the intermediate shaft 40 and the casings 73 and 74 is properly accomplished, thus providing an even more improved sealing between the nut 129 and the intermediate shaft 40. Furthermore, because of the hole 130, the lubrication of the intermediate shaft starts from the end portion thereof to which no drive force is transmitted, thus eliminating a need to provide a lubrication hole midway in the intermediate shaft to which a drive force is transmitted. Increased strength to the intermediate shaft 40 is, therefore, achieved.

Intermediate shaft 40, as herein embodied, has an axial hole 147 running through the center thereof, and radial holes 148 and 149 running from the axial hole to the outer peripheral surface of the shaft at a spacing in the axial direction from each other. A lubricating oil is introduced through axial hole 147 and radial hole 148 into the bearings 108 and 109 for lubrication thereof, and then introduced radially outwardly due to a centrifugal force into one-way clutchs 54 and 34, respectively. Sun gear shaft 27 has a radial hole 145 aligned with radial hole 149. Inner race 90 of one-way clutch 36 has a radial hole 146. The lubricating oil introduced through axial hole 147 and radial hole 149 in intermediate shaft 40 is admitted into one-way clutch 34 for lubrication thereof, and then introduced radially outwardly through radial hole 146 due to centrifugal force into one-way clutch 36 for lubrication thereof.

Referring now to the transmission gear unit 71 of the automatic speed change-gear assembly 70, there is provided a transmission shaft or countershaft 55 extending substantially in parallel to the intermediate shaft 40. Mounted at one end of the transmission shaft 44 is a driven gear 56 meshing with the output or driving gear 53 of auxiliary speed change-gear assembly 11. At the other end of the transmission shaft 55 there is mounted a drive gear 57. The transmission shaft 55 is rotatably supported and carried at opposite ends thereof by bearing means, such as bearings 110 and 111, as shown in FIGS. 2a and 2b. Preferably bearings 110 and 111 are roller bearings. An oil pressure governor unit 116 for detecting speed of the motor vehicle can be mounted on transmission shaft 55 between the drive gear 57 and driven gear 56.

Referring to FIG. 2b, a hole is provided in the left-hand end of the transmission shaft 55 in close proximity to the auxiliary casing 74. This hole is closed by a cap 142. A snap ring 143 and an O-ring 144 are fitted in the axially outer and inner circumferential portions of cap 142, respectively.

By placing the output gear 53 meshing with the driven gear 56 of transmission gear unit 71 in the portion of the overdrive gear unit 13 nearer to the engine rather than to the planetary gear unit 41, the axially outer end portion 74b, or cap 142, of transmission gear unit 71 can be indented axially inwardly toward the engine side of the transmission. From a different perspective, the clutch unit 48 and brake unit 49 for the overdrive unit 13 are housed in the projecting portion 74a of the auxiliary casing 74 for the auxiliary speed change-gear assembly 11.

As herein embodied, the driven gear 56 of the transmission unit 71 is diametrically larger than the drive gear 57 and has a parking gear 114 formed integrally therewith. Preferably, the driven gear 56 is formed with gear teeth 114 of the parking mechanism. When the operator of the motor vehicle shifts a shift lever to the P (parking) range, a pawl 113 is brought into engagement with parking gear 114 by way of a transmission link member 112, thereby arresting the driven gear 56 in a locked position. Since the parking gear 114 is formed integrally with driven gear 56, an increased strength in the parking gear results and no extra space for the parking gear is required.

Included as part of the transmission is a final reduction-gear assembly 60. In order to position the final reduction-gear assembly 60 substantially centrally in the vehicle in the lateral direction thereof, the drive gear 57 of the transmission gear unit 71 is positioned nearer to the torque converter 3 than the driven gear 56 and in mesh with a gear 61 of the final reduction-gear 60. Accordingly, a drive force from the output gear 53 is transmitted through the transmission gear unit 71 to the final reduction-gear assembly 60.

As is conventional, the final reduction-gear assembly 60 further comprises side gears 64, 65 meshing with pinions 66 and 67. Wheel axles 62 and 63, as here embodied, extend from the side gear 64 parallel to the axis of the auxiliary speed change-gear assembly 11. Axles 62 and 63 are connected to the wheels, such as the left and right front wheels of a motor vehicle (not shown). Shafts which rotatably support pinions 66 and 67 rotate along with the gear 61. When gear 61 is driven by gear 57, the wheel axles 62 and 63 are rotated accordingly.

Figure 4:
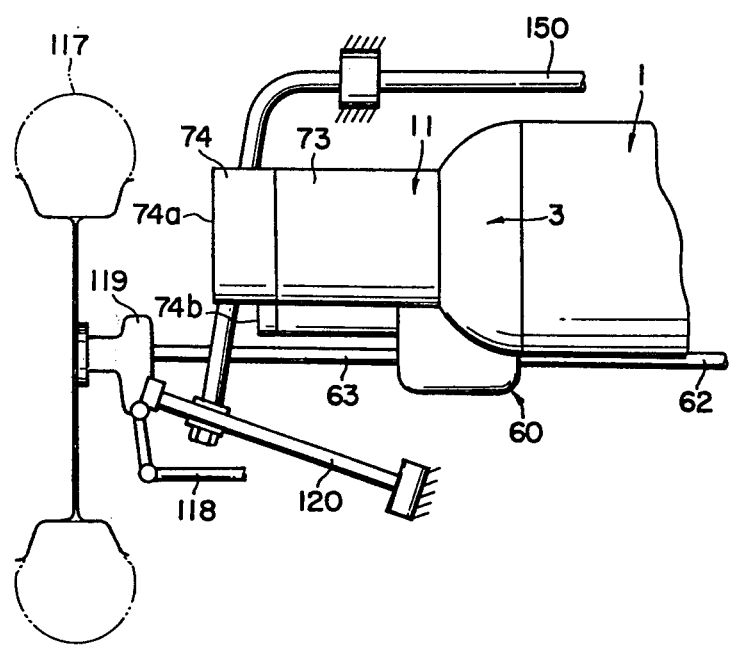

It may be seen that in addition to providing a compact transmission, the transmission of this invention is also free from interference with the suspension system of the motor vehicle. In FIG. 4, there is depicted schematically the positional relationship of the suspension system of the motor vehicle with the transmission system 70.

As herein embodied, a strut bar 150 of a strut-type suspension system for the motor vehicle is slidably provided sideways of the end portion 74b and below projecting portion 74a of the auxiliary casing 74. Strut bar 150 additionally serves as a stabilizer. Wheels 117 for the motor vehicle are connected by way of a steering knuckle 119 to axle 63 and a tie rod 118 in a manner to rotate freely and to be freely steered. A lower arm 120 and the strut bar 150 are connected to the steering knuckle 119 for fixing the wheels 117 to the vehicle chassis.

As may be seen from the foregoing description of one embodiment of a transmission in accordance with this invention, there is achieved a compact transmission which has a reduced length and which is free from interference with the suspension system of the motor vehicle.

It will be apparent to those skilled in the art that various modifications and variations could be made in the transmission of the invention without departing from the scope or spirit of the invention.

What is claimed is:

1. In a motor vehicle transmission for transmitting power between the engine and wheel axles of said vehicle, the transmission including:
   (1) a fluid-type torque converter;
   (2) an auxiliary speed change-gear assembly including an underdrive and an overdrive each comprising at least one planetary gear unit, the underdrive planetary gear unit being coaxial with and driven by the torque converter, said underdrive being disposed between said overdrive and said torque converter, and said overdrive planetary gear unit being coaxial with said torque converter and said underdrive unit and having an input element and an output element;
   (3) an intermediate shaft coaxial with said torque converter and said planetary units, said intermediate shaft extending through said speed change gear assembly and drivingly interconnecting said underdrive planetary unit with the input element of said overdrive planetary unit;
   (4) an output gear disposed between said underdrive and overdrive and being coaxial with said intermediate shaft, said output gear being drivingly fixed to the output element of said overdrive planetary unit;
   (5) a transmission gear unit including a counter shaft having a drive gear secured to one end thereof drivingly meshed with said output gear, and a driven gear secured to the other end thereof;
   (6) a final reduction gear assembly drivingly connected to said driven gear and to said wheel axles for transmitting power from said transmission gear unit to said wheel axles, said wheel axles being substantially parallel to said intermediate shaft; and
   (7) a casing for enclosing said speed change-gear assembly;

the improvement comprising:

(a) a radially extending flange integral with said intermediate shaft forming a part of the input element of said overdrive planetary unit;
(b) a first thrust bearing disposed axially between said overdrive and said underdrive and disposed radially between said intermediate shaft and said casing for rotatably supporting and receiving reaction force from said intermediate shaft;
(c) second and third thrust bearings axially adjacent each other and axially disposed between said flange and said first thrust bearing and radially disposed between said intermediate shaft and said output gear for rotatably supporting said output gear and for receiving thrust from said intermediate shaft, said flange and said output gear, the inner race of said second thrust bearing axially abutting said flange and the inner race of said third thrust bearing axially abutting the inner race of said first thrust bearing; and
(d) an axially adjustable nut threadably engaged in an opening in said casing, said nut being coaxial with said intermediate shaft and said opening circumscribing the end of said intermediate shaft remote from said torque converter, axial adjustment of said nut permitting application of a predetermined axial force to preload said thrust bearings and axially position said intermediate shaft.

2. The transmission of claim 1 wherein said second and third thrust bearings are counterbalancing thrust bearings.

3. The transmission of claim 1 further comprising a fourth thrust bearing radially disposed between the end of said intermediate shaft remote from said torque converter and said casing for rotatably supporting and receiving reaction force from said intermediate shaft.

4. The transmission of claim 3 wherein said nut axially abuts the outer race of said fourth thrust bearing.

* * * * *